Figure 1:
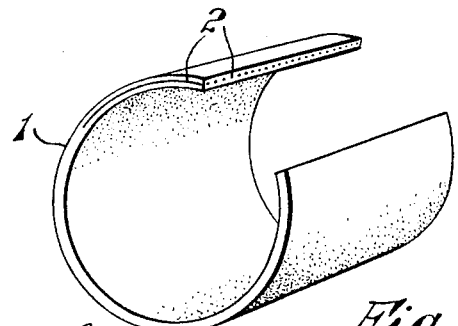

July 26, 1966 M. BALKIN ETAL 3,262,826
METHOD OF MAKING CORD REINFORCED DRAFT APRONS
Filed June 26, 1962

United States Patent Office 3,262,826
Patented July 26, 1966

3,262,826
METHOD OF MAKING CORD REINFORCED DRAFT APRONS
Mark Balkin and Denys G. Turner, Newcastle upon Tyne, England, assignors to George Angus & Company Limited, Newcastle upon Tyne, England
Filed June 26, 1962, Ser. No. 205,387
Claims priority, application Great Britain, July 4, 1961, 24,098/61
3 Claims. (Cl. 156—171)

This invention relates to the production of reinforced endless rubber belts or bands, and particularly to relatively small flat belts or bands which are used for supporting and conveying fibres in the drafting of textile fibres and are often called draft aprons.

In the specification of our United States Patent No. 3,008,860 there is described and claimed a method of manufacturing an endless rubber band or belt consisting of a unitary layer of rubber having a helical cord reinforcement embedded completely within the thickness of the rubber layer. In such method, a layer of rubber of a thickness to provide the desired thickness of a finished band or belt is prepared and placed as a sleeve in a plastic condition on a cylindrical mandrel and cord is wound, under controlled tension, helically on to the layer of rubber on the mandrel so that, by the act of winding, the cord cuts into and becomes embedded completely within the thickness of the rubber layer.

The above method is generally very satisfactory for making draft aprons but sometimes, particularly in the case of very thin aprons, the cord reinforcement is not quite accurately located within the thickness of the finished apron. If the cord penetrates too deeply into the thickness of the rubber on the mandrel, thereby tending to approach the inner surface of the eventual apron, it can be damaged in use by contact with the fluted or knurled driving rollers of the drafting mechanism. If the cord, on the other hand, does not penetrate sufficiently deeply it may become exposed at the outer surface of the apron during the final grinding operation in manufacture of the apron or in use.

Variation of the location of the cord in the thickness of the rubber can be caused by variation of the cord tension during winding, variation of the stiffness, viscosity or thickness of the plastic rubber composition into which the cord is embedded and by shrinkage of the cord caused by heating in vulcanisation.

The present invention provides a method of more accurately locating the cord in the thickness of a belt or apron and also enables aprons to be produced with different inside and outside surface characteristics if desired.

According to the invention, in a method of manufacturing an endless rubber band wherein a helical cord reenforcement is embedded by winding cord under tension to penetrate into plastic rubber composition on a cylindrical mandrel, the rubber composition on the mandrel is so prepared that an inner part of the thickness thereof is more resistant to penetration by the cord than is an outer part of such thickness.

This, the cord can be wound uder a tension sufficient for the cord to penetrate a relatively soft outer-surface portion of rubber composition on the mandrel but not sufficient for the cord to penetrate a relatively hard inner portion of rubber composition which thereby acts as an internal former locating the cord within the total thickness of rubber composition on the mandrel.

Figure 2:
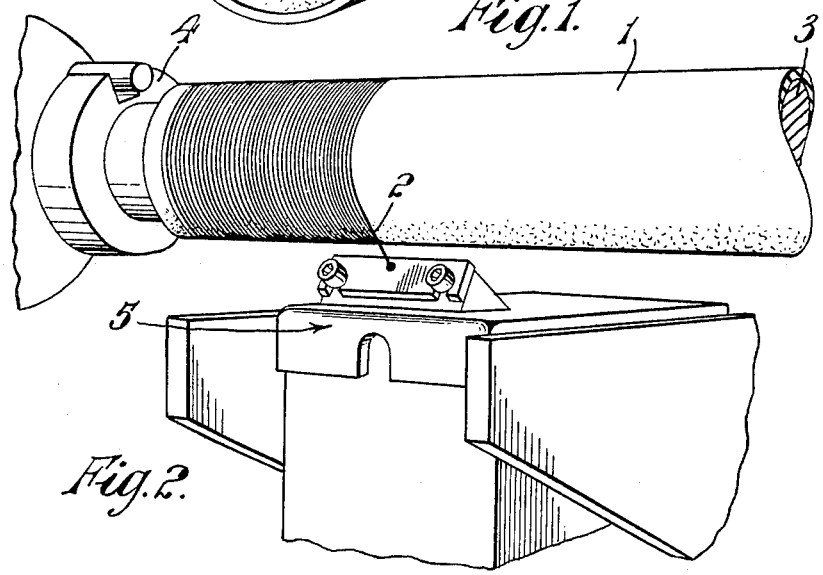
Figure 3:
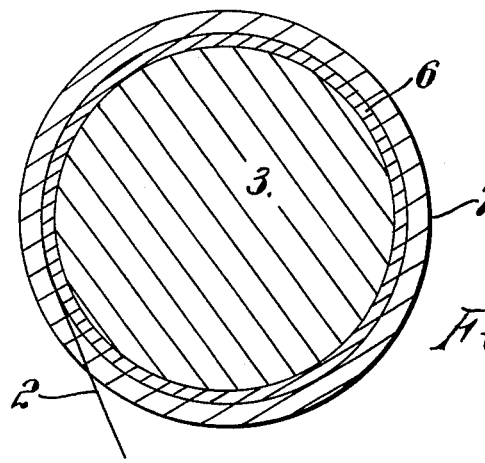

The invention is illustrated by the accompanying drawing, in which:

FIG. 1 is a perspective view of a reinforced rubber band, for use as a draft apron, with a piece cut out to reveal the internal structure, FIG. 2 is a fragmentary perspective view of part of the apparatus by which cord is wound under tension to become embedded within the thickness of a sleeve of plastic rubber on a mandrel and FIG. 3 is a cross-section of the mandrel with a sleeve of rubber thereon shown with a somewhat exaggerated thickness to illustrate the invention.

A known rubber band as shown by FIG. 1, and suitable for use as a draft apron for textile fibres, consists of a single thickness of rubber 1 within which is embedded a continuous length of cord 2, for example of nylon, forming a helical reinforcement, with spaced convolutions, through the middle of the rubber.

Such a reinforced rubber band is made, as illustrated by FIG. 2, by winding the cord 2 under controlled tension on to a sleeve of rubber 1 in plastic condition on a mandrel 3 rotated by a chuck 4, the cord being tensioned, and preferably coated with rubber solution, by apparatus indicated as 5. This winding method and apparatus is fully described in our United States patent specification No. 3,008,860.

The same, or equivalent, winding method and apparatus is used in carrying out the present invention, which will be further described with reference to FIG. 3.

A rubber composition sleeve or mandrel covering is formed in two, inner and outer, layers of which the inner layer 6 is tougher or less plastic than the outer layer 7.

The two layers 6 and 7 may consist basically of the same rubber composition but with different proportions of ingredients, for example the outer layer 7 having a much higher proportion of a plasticiser than the inner layer 6.

Alternatively, two different but compatible rubber compositions could be used, particularly if it is desired to make a band or apron with an inner surface having different characteristics, such as of wear-resistance or friction, than the outer surface.

The rubber compositions used for the inner and outer layers should desirably have similar thermal expansion characteristics. Otherwise stresses will be set up during cooling of the wound tube after hot vulcanising which will tend to cause distortion of the finished apron.

In preparing the sleeve or mandrel covering, any convenient method of forming two compositions into inner and outer layers on the mandrel may be used. For example, two inter-fitting sleeves of the two compositions may be extruded and passed on to the mandrel or calendered sheet of one composition may be wrapped on the mandrel and itself be wrapped by sheet of the other composition.

When the procedure of helical winding of the cord under tension is carried out, the cord 2 cuts through the more plastic outer composition 7 until it meets the resistance of the tougher inner composition 6 which thus locates the cord accurately within the thickness of the composite layer of rubber composition on the mandrel.

When the manufacturing operations are completed, usually comprising wrapping the wound mandrel in wet cloth and vulcanising in a steam pan, the tougher inner composition still resists penetration by the cord, under the effect of shrinkage, and thus the location of the cord is maintained.

Inspection of a cut sample of an apron made by the above-described method shows the cord located substantially at the junction between the two compositions, the cord being completely embedded within the outer layer and closely surrounding the inner layer.

It must be observed that, although the method involves the use of two distinct composition layers, the final product has a unitary structure, the two compositions having become intimately united at their interface which is, of course, formed with complete mutual contact of the two layers before the cord is wound.

The present method and its product are thus clearly distinguished from the previously known method of making laminated draft aprons by winding a body of cord helically on to the surface of a layer of rubber on a mandrel and then covering the wound body of cord by an outer layer of rubber.

In the present method, difficulties due to trapping of air between a wound body of cord and a subsequently applied layer of rubber are avoided, such difficulties being incomplete adhesion and the presence of air blisters. In the present method, any air which might be trapped between the two composition layers, when they are assembled, is released as the cord, during winding, cuts through the outer layer up to the surface of the inner layer.

An example of materials used in carrying out the present invention is as follows:

Two compositions of oil-resistant synthetic rubber are prepared in the usual way, such as on a two-roll mixing mill, according to the following formulae:

|  | Inner layer (6) | Outer layer (7) |
|---|---|---|
| Butadiene-acrylic nitrile copolymer | 100 | 100 |
| Sulphur | 2 | 3 |
| Zinc oxide | 5 | 5 |
| Stearic acid | 0.5 | 0.5 |
| Reinforcing filler (e.g., carbon black) | 55 | 50 |
| Plasticiser (e.g., tricresyl phosphate or dibutyl phthalate) | 15 | 35 |
| Accelerator (may be varied to suit vulcanisation time) | 1.5 | 1.5 |

The inner layer composition should have a Mooney plasticity value of not less than 70 and the outer layer composition a value of about 20, both tested at 120° C. using the large (1½") rotor.

As mentioned above, the two layers may be formed by extrusion or by wrapping calendered sheet. If the inner layer is made by a single wrapping it should preferably be made with a butt point. If an overlap joint is made, it should be moistened with a solvent or plasticiser to provide local softness to permit subsequent partial penetration of the cord at the overlap.

After formation of the two-composition composite covering on a mandrel, the winding process and subsequent operations can be carried out, using fine nylon thread for example, as described in the specification of out Patent No. 3,008,860.

The term "rubber" used in this specification and the appended claims is intended to include natural and synthetic rubber and rubber substitutes comprising the synthetic plastics known as elastomers.

We claim:

1. In a method for producing an endless cord reinforced rubber band comprising the steps of, preparing on a cylindrical mandrel a sleeve of rubber composition in plastic condition, the sleeve having a wall thickness corresponding to the required thickness of the band, the sleeve having inner and outer layers of rubber composition having different physical properties, the inner layer being more resistant than the outer layer, winding helically around the sleeve a reinforcing cord, and maintaining controlled tension on the cord, the cord cutting through the less resistant outer layer of the sleeve and being arrested by the more resistant inner layer of the sleeve.

2. The improvement in the method according to claim 1, wherein the rubber band is a draft apron, the rubber composition of both layers is a plasticized butadiene-acrylic nitrile copolymer composition and the outer layer composition contains a higher proportion of plasticiser than the inner layer composition in a ratio of the order of 7:3.

3. The improvement in the method according to claim 1, wherein the relative plasticity values of the composition forming the inner and outer layers respectively correspond to Mooney plasticity values of not less than 70 for the inner layer and about 20 for the outer layer, both tested at 120° C. using a large rotor.

References Cited by the Examiner

UNITED STATES PATENTS 3,008,860  11/1961  Balkin et al. _____ 156—171

FOREIGN PATENTS 866,999  5/1961  Great Britain.

EARL M. BERGERT, *Primary Examiner.*

R. J. CARLSON, P. DIER, *Assistant Examiners.*